Figure 1:
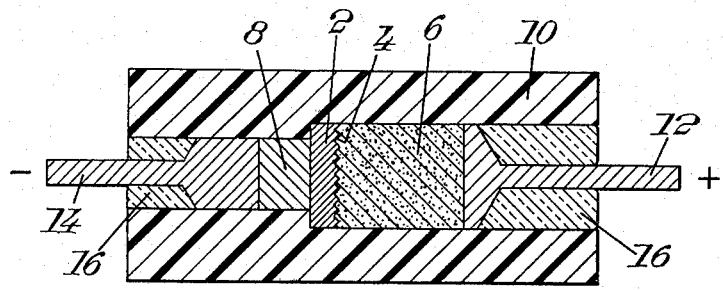

United States Patent [19]
Armand

[11] 3,956,194
[45] May 11, 1976

[54] MIXED CONDUCTORS OF GRAPHITE, PROCESSES FOR THEIR PREPARATION AND THEIR USE

[76] Inventor: Michel B. Armand, 12 rue Conde, 38100 Grenoble, France

[22] Filed: Aug. 17, 1973

[21] Appl. No.: 389,617

[30] Foreign Application Priority Data
Aug. 18, 1972 France.............................. 72.29734

[52] U.S. Cl................................ 252/507; 252/506; 260/429 R; 260/438.1; 260/438.5 R; 260/439 R; 136/120 R; 136/121
[51] Int. Cl.².......................................... H01B 1/06
[58] Field of Search........................... 252/507, 506; 260/429 R, 438.1, 438.5, 439 R; 136/120 R, 121

[56] References Cited
UNITED STATES PATENTS
3,409,563  11/1968  Olstowski............................ 252/506
3,759,842  9/1973  Bianchi et al.................. 252/507 X OTHER PUBLICATIONS
*Journal of American Chemical Society,* Vol. 78 (1956), "Reactions of Sodium Metal with Aromatic Hydrocarbons," pp. 116–120.
R. C. Croft, "New Molecular Compounds of Graphite," (Third Biennial Carbon Conference), 1958, pp. 315–319.
Quarterly Reviews–Croft: "Lamellar Compounds of Graphite," Proceedings of London Chemical Society (Chemical Soc. London), Vol. 14, pp. 1–45 (1960).
M. E. Vol'Pin et al.–Izvestiya Akademii Nauk USSR, Seriya Khimicheskaya, No. 11, pp. 2608–2609 (Nov. 1970).
M. B. Armand–"Fast Publisher, Transport in Solids," Van Gool (Editor), North Holland Publisher, (1972).
"L.' Insertion Dans Les Carbones," (Les Carbones, Groupe Francais des Carbones), Masson (Ed.), Paris (1955), pp. 564, 582.

*Primary Examiner*—Leland A. Sebastian
*Assistant Examiner*—E. Suzanne Parr
*Attorney, Agent, or Firm*—Burgess, Dinklage & Sprung

[57] ABSTRACT

New mixed conductors resulting from the insertion of an alkali element in the lattice of an intercalation compound of graphite and of a product $M'_y X_z$ : $M'$ is a transition metal such as Ti, V, Cr, Mn, Fe, Mo; X is a nonmetallic electronegative atom such as O, S, F, Cl or Br; $y$ and $z$ have the values of the indices in said product $M'_y X_z$. These mixed compounds are useful for the manufacture of positive electrodes of electrochemical generators.

19 Claims, 2 Drawing Figures

MIXED CONDUCTORS OF GRAPHITE, PROCESSES FOR THEIR PREPARATION AND THEIR USE

The invention relates to novel mixed and non stoichiometric compounds of graphite, to methods for preparing such mixed compounds and to uses thereof, such as for the manufacture of electrodes for electrochemical generators.

It has already been proposed to use alkali metals for production of cells or even of storage batteries of high electrical capacity and using solid electrolytes of cationic-conduction type. Thus, one of the materials suggested for electrodes belongs to the so-called tungsten-bronzes series formed of tungsten or vanadium complexes with alkali metal oxides. The measures of conductivity which have been achieved with such electrodes prove the scientific value of such materials. However, the high price and the high molecular weight of these materials prohibit their large scale use for the production of storage batteries.

Storage batteries of high electrical capacity, particularly sodium-sulphur batteries have also been disclosed. It should however be mentioned that a storage battery of the latter kind can only be operated at a temperature above 300°C, which is obviously a serious drawback in quite a number of uses.

More specifically, the invention relates to mixed compounds derived from graphite compounds of formula $C_n(M'_yX_z)$ wherein $M'$ represents a transition metal ion such as Ti, V, Cr, Mn, Fe, Mo; X represents a non-metallic electronegative atom such as O, S, F, Cl or Br; $y$ and $z$ have values corresponding to indices defining the relative proportions of metal and non-metallic atoms respectively in the formula of the products $M'_yX_z$ incorporated in the composition of the aforesaid graphite derivatives; $n$ has a value equal to or higher than a minimum value which is a function of the initial binding energy between graphite and the compound $M'_yX_z$ under consideration, this value not however falling below that corresponding to the formation of continuous monomolecular graphite layers interposed between the layers of the compound $M'_yX_z$ in the corresponding compound $C_n(M'_yX_z)$. These compounds $C_n(M'_yX_z)$ will be referred to thereafter as "intercalation compounds" of graphite and products $M'_yX_z$.

To this category of graphite derivatives $C_n(M'_yX_z)$ belong in particular products of the type disclosed by CROFT (Austr. J. Chem., 1956, 9, 201). The main members of this group consist e.g. of intercalation derivatives of graphite and of the compounds $FeCl_3$, $CoCl_3$, $CrO_3$, $CrO_2Cl_2$, the chemical similarity of which is due to the organometallic type bounds between the orbitals "$\pi$" of the graphite and the partially empty orbitals "$d$" of the transition metal. Compounds disclosed by CROFT are characterized by a conductivity which is solely electronic.

It has already been proposed to react intercalation compounds of graphite and of chlorides of Mo, Mn, Fe, Co, Ni and Cu with strong alkaline reducing agents (Izvestiya Akademii Nauk SSSR, Seriya Khimicheskaya, No. 11, pp. 2608–2609, November 1970, M. E. Vol'pin, Yu. N. Novikov, Yu T. Struchkov, V. A. Semion). However attempts to reduce such graphite derivatives by means of mixed hydrides of the type $LiAlH_4$ or $NaBH_4$ have not been successful under the disclosed operating conditions, to provide a reduction of such intercalation compounds. The authors however reported that parts of the reducing agents were incorporated into said intercalation compounds. The resulting compounds could not have more than a limited stability when considering the nature of the initially used reactants. Moreover it is most unlikely that their components could have been separated again, such as by electrochemical methods.

Attempts to reduce the aforesaid intercalation compounds with a solution of sodium in liquid ammonia have lead to the liberation of salts and formation of metal phases distinct from that of the graphite compounds.

Attempts to reduce the intercalation compounds with an aromatic ion-radical, e.g. a solution of biphenyl-lithium in tetrahydrofuran, have lead under experimental conditions disclosed, both to a complete reduction of the transition metal of said salts to a metal state, the metal being however retained in the graphite lattice, and to the formation of alkali chloride phases distinct from that of the graphite compound.

Accordingly, the compounds obtained in all the instances mentioned hereabove were either unstable or multiphased.

An object of the invention is to obtain monophased materials from graphite derivatives of the kind aforesaid, having besides the electronic conductivity indicated hereabove a ionic conductivity making them suitable for use as electrode material for electrochemical generators using liquid or preferably solid electrolytes.

Another object of the invention is to further provide electrode materials for the manufacture of storage battery units having a high electrical capacity, operable at room temperature and of low cost.

The compounds according to the invention are mixed compounds derived from monophased intercalation compounds of graphite represented by the formula $C_n(M'_yX_z)$ in which $M'$, X, and the indices $n$, $y$ and $z$ have the above-indicated meanings, such mixed compounds being characterized by the insertion in their lattices of alkali elements such as Li, Na, K, Rb, Cs and $NH_4$, the proportion of the inserted alkali elements not exceeding the maximum value compatible with the monophased character of the original intercalation compounds.

The monophased compounds according to the invention can also be represented by the formula $M_xC_n(M'_yX_z)$ in which M is an alkali cation such as Li, Na, K, Rb, Cs, $NH_4$; $M'$ is a transition metal such as Ti, V, Cr, Mn, Fe, Mo in a state of oxidation higher than that (limit oxidation state) which determines the formation or precipitation of a separate phase; X is a non-metallic electronegative atom such as O, S, F, Cl or Br; $y$ and $z$ have the values of indices defining the relative proportions of metal and non-metallic atoms respectively in the formula of products $M'_yX_z$ from which said mixed graphite compounds are derived; $x$ has a value other than zero and comprised between O and a value depending on the affinity of the selected alkali metal for the corresponding compound of formula $C_n(M'_yX_z)$ and $n$ is a number equal to or higher than a minimum value depending on the initial binding energy between the graphite and the compound $M'_yX_z$ under consideration, this value not falling below however that corresponding to the formation of continuous monomolecular graphite layers interposed between the layers of the compound $M'_yX_z$ in the corresponding compound $C_n(M'_yX_z)$.

The respective minimum and maximum values which may be given to $x$ and $n$ can be determined in each case either experimentally or by calculation using thermodynamic data. As for $n$ it should be noted that the binding energy between the graphite and the compound $M'_yX_z$ decreases as the graphite lattice is being progressively saturated with the compound $M'_yX_z$. The relative proportions of graphite and of compound $M'_yX_z$ may not reach the aforesaid minimum value if said binding energy was originally low.

It will be noted that in one of the preferred categories of mixed compounds according to the invention, viz. the one in which compound $M'_yX_z$ is $CrO_3$, it is possible to reach the abovedefined saturation maximum, whereby $n$ will be equal to 6.

Likewise, the maximum value of $x$ may vary from one alkali metal to another. It will be observed by way of example that it may take values between 0 and 3, when the alkali metal is sodium, and values between 0 and 4, when the alkali metal is lithium.

The invention also relates to a method for preparing mixed compounds of the type aforesaid.

In one of the embodiments of said method, it comprises reacting the corresponding derivatives of graphite of formula $C_n(M'_yX_z)$ in which $M'$ and $X$, on the one hand, and indices $n$, $y$ and $z$, on the other hand, have the previously defined meanings, with a compound capable of liberating an alkali metal used in stoichiometric proportions determined by the value of $x$ in the desired monophased mixed compound.

The so-called "anion radicals" such as a naphtalenealkali metal are suitable for the above purpose.

It will be recalled that an "anion-radical" may be considered as consisting of an organic molecule linked to a metal ion, said organic molecule trapping an electron, the "anion-radical" being capable of providing to a substrate (a graphite compound of formula $C_n(M'_yX_z)$ in the instant invention) both metal ions and electrons. Among the anion-radicals defined as hereabove are those of which the organic molecule can be freed in the absence of any decomposition, while the metal is being released.

The proportions of "anion-radical" used in the aforesaid manufacturing method should not exceed those for which the content of alkali metal in the final compound would tend to exceed the higher maximum value which has already been defined. The use of too high proportions of "anion-radical" could lead to the conversion of the transition metal to a state of oxidation lower than the abovementioned limit oxidation state, and thus cause formation or precipitation of a separate phase. The multiphased compound thus obtained could not be used as an electrode-material for electrodes of a storage battery cell operative with a solid electrolyte, such as β-alumina, under the conditions which will be described later on.

By way of indication it should be pointed out that upon using intercalation compounds of graphite and ferric halide, the forming or precipitating of the separate phase would take place when the oxidation number of the transition metal in the final mixed compound would tend to fall below a value of 2. The same would probably be true when using mixed compounds of graphite and derivatives of chromium oxide. In other words, when starting with the aforesaid graphite compounds, monophased compounds of insertion containing alkali metal are obtained as long as the oxidation number of the iron in the final products is kept between 2 and 3 and that of chromium between 2 (in so far as this value can be considered to correspond to the limit oxidation state) and 6.

Aliphatic or aromatic hydrocarbons substituted by an alkali metal can also be used as compounds capable of liberating an alkali metal, in the process according to the invention. Examples of such compounds are methyl-lithium, butyl-lithium or phenyl-lithium, which are available in the trade.

When the intercalation compound of graphite and of chromic oxide is used, one may also resort to solutions of the alkali metal in a polar solvent, for instance sodium in liquid ammonia. Owing to the wide range of oxidation states which chromium can take (from 6 to about 2), the danger that the sodium will induce the reduction of the chromium oxide to a metal chromium is very low. The use of the metal sodium in a polar solvent is however prohibited in the case where the starting intercalation compound is one of the graphite and of an halogenide like $FeCl_3$, in view of the short range of oxidation states (from 3 to 2) which is available, without risk of precipitation of metallic iron.

The process of the invention can be carried out in a solvent for the compound capable of liberating the alkali metal.

The reaction can notably be carried out in a polar aprotic solvent, such as 1,2-dimethoxyethane, tetrahydrofuran, a mixture of 1,2-dimethoxyethane and naphtalene, etc. or, when the chosen alkali metal is lithium, in a non-polar solvent such as hexane.

It is also possible to obtain the insertion of the alkali metal in the intercalation compound $C_n(M'_yX_z)$ by forming the same into a positive electrode of an electrochemical generator, by associating it electrochemically with a negative electrode containing the alkali element to be inserted into the lattice of compound $C_n(M'_yX_z)$ either in the pure metallic state or in an alloyed form, through the intermediary of an electrolyte permitting conduction of ions of the alkali metal under consideration and by causing a controlled unloading of the electro-chemical generator so contrived dependant upon the desired proportion of alkali ions in the positive electrode.

Monophased compounds of formula $M_xC_n(M'_yX_z)$ are thus obtained which may be considered as insertion products of alkali metal atoms into the lattice of the initial compound $C_n(M'_yX_z)$ and having distinct properties with respect to those of a mixture of the initial graphite compound and the corresponding alkali metal.

The composition of the final mixed compound depends on the relative proportions of the initial products reacted under the conditions specified. It will also be appreciated that insertion of alkali metal atoms into the compounds $C_n(M'_yX_z)$ is effected without any increase of volume.

The mixed compounds according to the invention can also be considered as resulting from a partial reduction, under the above-defined conditions, of the initial products $C_n(M'_yX_z)$ by the alkali metal, the introduction of an atom thereof entailing in the formula of the mixed compound obtained a decrease by one unit of the oxidation number of the transition metal contained therein.

The X-rays diffractogram of the mixed compounds obtained shows only the peaks of pure graphite, even at the highest concentrations of alkali metal. The analysis with the CASTAING's microprobe shows that all the metal atoms of the mixed compounds are evenly distributed in the solid, so that the mixed compounds can be considered as a true solid solution of the species $M_x(M'_yX_z)$ within the graphite lattice.

The band at 11.6 A of the compound $C_8CrO_3$ disappears however in the mixed compounds formed starting from the former when the preparation of the latter is carried out in a polar solvent. On the contrary, when M is lithium and the reaction is effected in a polar solvent, the persistence of the band at 11.6 A will be observed.

Thus, the disappearance of this band at 11.6 A has been observed when the compound of formula $Na_xC_8.CrO_3$ has been formed by reacting a derivative of formula $C_nCrO_3$ with sodium metal in solution in liquid ammonia at a temperature of −40°C or in a polar solvent such as 1,2-dimethoxyethane or a mixture of naphtalene and 1,2-dimethoxyethane.

On the contrary, when forming the compound of formula $Li_xC_8CrO_3$ in accordance with the equation shown below:

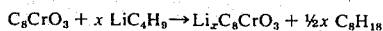

$$C_8CrO_3 + x\ LiC_4H_9 \rightarrow Li_xC_8CrO_3 + \tfrac{1}{2}x\ C_8H_{18}$$

in a non-polar solvent such as hexane, no change in the X-rays has been found in the product obtained as compared to the X-rays diagram of the initial intercalation compound.

The modification of the X-rays diagram of the mixed compounds produced by the above reaction in a polar medium may be attributed to the fact that the polar solvent tends to solvate the ions of the alkali metal inserted in the lamellar lattice of the initial graphite compounds, whereby the insertion is effected at the expense of a slight warping or disarrangement or said lamellar structure.

On the contrary the persistence of the band at 11.6 A in the second example mentioned above would tend to demonstrate that the formation of the mixed graphite compounds of the invention takes place without disarrangement of the graphite planes in the initial compound upon introduction thereinto of the nonsolvatable lithium by means of the non-polar medium.

A study of the reaction rates of the alkali metal with the initial compound $C_n(M'_yX_z)$, especially the reaction of sodium or lithium with particles of the intercalation compound of graphite and of chromic oxide in suspension in liquid ammonia, shows that the diffusion process of the alkali metal in the solid is apparently very fast. Kinetic tests have enabled the diffusion coefficient of the alkali metal in the compound $C_n(M'_yX_z)$ to be evaluated. In the case of the above-described mixed compounds containing sodium, the diffusion coefficient is of about $D = 10^{-6}$ cm²/sec. Such a high value of the diffusion coefficient of the alkali metal in the initial compound is to be ascribed to the fact that the mixed compounds of the invention are mixed conductors, both ionic and electronic.

The possible reasons for the high mobility of the alkali ions are of three kinds:

delocalizations of electrons are involved in the oxido-reduction process ("s" and "d") in band $\pi$ of graphite;

the electrostatic interactions between ions are reduced, the mobile electrons acting as "screens" between said ions;

the atoms of the transition metal and the non-metallic strongly electronegative compounds previously existing in the compound $C_n(M'_yX_z)$ act like struts between the carbon planes and enable ions, even bulky ions such as potassium ions, to freely move between said planes.

Mixed derivatives of chromium and sodium or lithium may be considered as especially representative of those mixed graphite compounds according to the invention which are derived from chromium oxide $CrO_3$. Such derivatives are in the form of black powders resembling the intercalation compounds of graphite and pure chromium oxide of which they are derived, particularly after separation or evaporation of the reaction solvent. However they are hygroscopic and subject to decomposition under the action of steam, so that they must be handled in dry atmosphere.

They are stable up to temperatures above 200°C. At higher temperatures, the insertion of alkali metal becomes unstable. An extended annealing during one hundred hours of the mixed compounds at a temperature close to 250°C brings forth visible X-ray bands, which bands have not been identified.

The invention also relates to the use of the graphite derivatives of formula $C_n(X'_yX_z)$ or of such derivatives containing alkali atoms inserted therein, for the manufacture of electrodes for electrochemical generators, particularly of the storage battery type using solid or liquid electrolytes.

Their use is of particular advantage for the manufacture of cells or storage batteries using a solid electrolyte and containing an electrochemical chain:

$$M/\text{solid electrolyte}/M_{x_1}C_n(M'_yX_z)$$

in which the electrode M is the negative electrode and contains one of the above-indicated alkali elements either in the pure metallic form or in the form of an alloy with another metal, and in which the opposite electrode, i.e. the positive electrode, contains a compound $M_{x_1}C_n(M'_yX_z)$ in which M is the same alkali metal as that of the negative electrode; $n$, $y$ and $z$ have the aforesaid values; $x_1$ is zero or has any of the values indicated above for $x$; and finally the solid electrolyte is of the type that enables conduction of alkali metal ions to take place.

In a storage battery, the negative electrode is formed of the pure alkali metal or of an alloy containing said alkali metal and of the type usable for reversible electrodes. Alloys of aluminum and sodium or potassium and sodium are illustrative of those which can be used to form the negative electrodes of storage batteries whose positive electrodes are formed with a mixed compound of graphite containing sodium. In the same way aluminium-lithium alloys are illustrative of the alloys which can be used in a storage battery, in association with a positive electrode formed with a graphite mixed compound containing lithium.

When the active alkali metal of electrode M consists of sodium, a preferred solid electrolyte consists of a βalumina containing sodium, of the type described in the article of YUNG-FANG YU YAO and J. T. KUMMER, J. Inorg. Nucl. Chem., 1967, Vol. 29, 2453–2475, Pergamon Press Ltd.

When the active alkali metal of electrode M is potassium or sodium, one may advantageously use a solid electrolyte consisting of βalumina containing potassium or lithium, also of the type described in the above publication.

When the active alkali metal of electrode M is lithium, the solid electrolyte can also be formed of lithium iodide, preferably doped with calcium chloride.

The graphite derivatives of formula $C_n(M'_yX_z)$ or derivatives of the same kind which contain alkali atoms inserted therein may also be used for manufacturing storage batteries operative with a liquid electrolyte and which are therefore characterized by the electrochemical chain:

M/liquid electrolyte/$M_{x_1}C_n(M'_yX_z)$ in which the two opposite electrodes have the same characteristics as disclosed hereabove in connection with the storage batteries operative with a solid electrolyte, and in which the liquid electrolyte is substantially inert with respect to the negative electrode M and contains a salt or complex capable of liberating the corresponding metal ion at the electrolyte/positive electrode interface.

When the active metal of electrode M is sodium, it is possible to use for example a solution of sodium perchlorate in propylene carbonate. The latter solvent is relatively resistant to sodium.

When the active alkali metal of electrode M is lithium (which is less aggressive against solvents than is sodium), the liquid electrolyte is advantageously formed of a solution of lithium perchlorate in a solvent such as propylene carbonate, dimethylformamide, gamma-butyrolactone, tetramethylenesulfone, dimethylsulfoxide.

Generally speaking, the publication "Non-aqueous solvents Handbook" by Janz and Tomkis, Vol. 1, Academic Press 1972, New York, may be referred to for the choice of an appropriate solvent.

The electromotive force on the one hand, and the theoretical capacities, on the other hand, of storage batteries and cells so formed may reach considerable values, as will be seen in the description hereafter of storage battery units according to the preferred embodiments of the invention.

Figure 2:
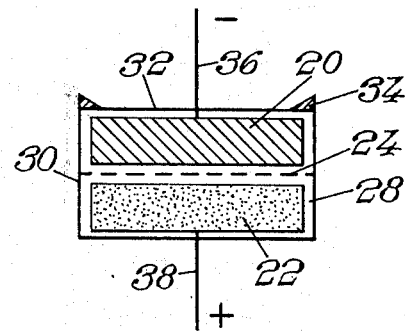

Additional features and advantages of the invention will become clear upon reading the following description of examples of preparation of mixed graphite compounds according to the invention as well as of preferred embodiments of electrochemical generators making use of either such mixed compounds or the graphite intercalation compounds from which such mixed compounds can be obtained. Reference will be made to the appended drawing in which FIGS. 1 and 2 show diagramatically two embodiments of said electrochemical generators.

EXAMPLE 1

Preparation of an intercalation compound of graphite and chromic oxide compound, the formula of which is $C_8CrO_3$ 0.96 g of pure graphite available in the trade under the trademark ULTRACARBON and 0.998 g of chromium trioxide were weighed and mixed in a glove-box swept with dry nitrogen obtained from evaporation of liquid nitrogen. The fineness of the particles of the graphite powder enabled said mixture to be prepared in a mortar. The powder obtained was transferred to a graphite crucible and heated within two hours up to 200°C ± 5°C. The purpose of this rather slow temperature rise was to prevent graphite from being oxidized by chromium oxide, the aforesaid temperature being thereafter maintained for 48 hours. The cooling of the graphite/chromic oxide intercalation compound did not require any special care.

EXAMPLE 2

Preparation of a compound of formula $Na_xC_8CrO_3$

This preparation was carried out by reacting the compound $C_8CrO_3$ with a solution of sodium in a solution of naphtalene in dimethoxy-1,2 ethane. The dimethoxy-1,2 ethane used had been held previously in contact with sodium flakes and the naphtalene with calcium chips for the purpose of rendering them perfectly anhydrous.

Several preparations were made. The amount of sodium used in each of said preparations was between 0.3 and 0.5 g. In all instances, the amount of naphtalene used was in excess of 3 g with respect to the stoichiometric proportion required for preparing the naphtalene-sodium compound. These reactions were effected within 75 ml of solution in a three-necked vessel (250 ml), the inner volume of which was swept by a dry nitrogen stream.

The amount of the intercalation compound $C_8CrO_3$ added to the sodium (within about 1 hour) and reacted therewith was dependant on the amount of sodium dissolved in the solution and also on the stoichiometric proportions with respect to the value of $x$ in the compound $Na_xC_8CrO_3$ sought to be obtained. The mixture was continuously stirred. The completion of the reaction was indicated by the disappearance of the colour of the initial naphtalene-sodium complex. The mixed graphite compound finally obtained was filtered on sintered glass of fine porosity and washed with pure anhydrous 1,2-dimethoxy-ethane. The final product was dried under vacuum and stored in a dry atmosphere.

Such procedure yielded compounds of formula $Na_xC_8CrO_3$ in which the values of $x$ were respectively 0; 0.5; 1; 1.5; 2; 2.5; and 3.

EXAMPLE 3

Preparation of compounds of formula $Li_xC_8CrO_3$

The reaction which was resorted to is illustrated by the following equation:

$$x\ LiC_4H_9 + C_8CrO_3 \rightarrow \tfrac{1}{2}x\ C_8H_{18} + Li_xC_8CrO_3$$

Butyl-lithium is available in the form of solutions thereof in hexane containing accurately determined proportions, generally comprised between 20 and 25% in weight of butyl-lithium with respect to the total solution. Since butyl-lithium is highly reactive, a few ml of the solution were weighed in a sealed flask. The amount of $C_8CrO_3$ determined according to the value sought for $x$ was weighed in like manner. The latter product was then suspended in about 50 ml of anhydrous hexane previously kept on sodium within a vessel shielded from the surrounding atmosphere and the mixture was stirred. Butyl-lithium was added to the suspension and the mixture stirred. Periodically the rate of reaction was controlled by withdrawing a drop of the liquid phase, diluting it in hexane and adding methanol or ethanol. The alcohol precipitated lithium alcoxide as long as the reaction was not complete. After 24 hours, the reaction was ended. The liquid phase did not contain lithium any more. The solid product was filtered, washed in hexane and dried. All these operations were effected under vacuum. This procedure yielded compounds of formula $Li_xC_8CrO_3$, wherein $x$ had values of 1; 2; 3; and 4, respectively.

EXAMPLE 4

Preparation of a compound of formula $Na_xC_{12}MnCl_z$ (with $z$ being greater than 2)

10 g of graphite in the form of fine flakes whose particle sizes were less than 80 microns were mixed with 8.7 g of manganese chloride $MnCl_2$ and 15 g iodine trichloride $ICl_3$ (chloriding agent). The mixture was heated during about 200 hours at 110°C in a sealed ampula. The resulting product was washed several times with dichloromethane. X-ray analysis showed absence of free manganese chloride in the compound obtained. The latter was added to a solution of 0.5 g sodium in the form of naphtalene-sodium in 1,2-dimethoxy-ethane, which solution has been obtained according to the procedure disclosed in example 2. The addition of a solution of sodium in naphtalene and the reaction were carried out under the same conditions as in example 2. The monophased graphite mixed product which was finally obtained contained both manganese and sodium.

EXAMPLE 5

Manufacture of a high-performance storage battery comprising the electrochemical chain sodium/βalumina/$Na_x$ $C_8CrO_3$ An experimental model of a storage battery of this type is shown in FIG. 1 of the drawing, in which the solid electrolyte 2 consists of a block of βalumina of formula

in which the letter V is the abbreviation of the word "vacancy", $x$ is comprised between 0 and 0.3, which block had been sintered under pressure at 1600°C and cut to the shape of a disk having a diameter of 9.5 mm and a thickness of 0.37 mm. The side 4 of the disk in contact with the electrode formed with the compound $Na_xC_8CrO_3$ has previously been striated by means of a diamond-cutter in order to improve contacts and prevent separation of the solid electrolyte and said electrode. The electrode itself had been formed by pressing a powder of the graphite mixed compound against the solid electrolyte disk in a steel mold under a pressure of 1 ton/m².

The other electrode is formed of a sodium pellet 8 directly shaped on the opposite side of the solid electrolyte disk.

The so-formed cell is protected by a polyethylene body 10. Two brass conductors 12, 14 are in electric contact with both electrodes and are tightly embedded within the polyethylene body by means of packings 16 formed of an epoxy resin and capable of preventing any contact between the electrodes and the surrounding air. Advantageously a piston, e.g. a brass piston and a metal spring (both of which are not shown in FIG. 1) are interposed between the sodium electrode 8 and the brass conductor 14, the piston and the spring biasing the sodium electrode against the electrolyte.

The experimental storage battery unit, so achieved, is characterized by an e.m.f. of 3.9 volts and is capable of providing a density of current of 0.1 mA/cm².

It will be appreciated that the unloading of such a storage battery unit in an external circuit involves an enrichment — and its loading a depletion — of the positive electrode in alkali metal. The maximum loading is achieved, at least in theory, when the positive electrode is completely depleted in, i.e. is devoid of, alkali metal, that is when its active component consists of the initial intercalation compound of graphite and of the product $M'_yX_z$.

The densities of current which can be obtained may be increased considerably by improving the quality of contacts as well as the protection of the sodium electrode and of the electrolyte against the surrounding atmosphere, particularly to prevent sodium from being oxidized and βalumina from being hydrolized, thus from being covered with insulating films.

In a preferred embodiment of the invention a thin layer of sodium-mercury amalgam rich in sodium is interposed between the negative sodium electrode and the electrolyte. The depleting in sodium of said thin amalgam layer at the interface it forms with the electrolyte during the unloading of the storage battery is compensated by the release from the amalgam of corresponding amounts of mercury which in turn dissolve corresponding amounts of sodium from the negative electrode, so that the amalgam is continuously regenerated as long as the storage battery is being unloaded. For example, good results will be obtained with an amalgam containing 97 moles % of sodium and 3 moles % of mercury. Generally the mercury concentration in the amalgam should be comprised between infinitesimal proportions and amounts corresponding to the eutectic proportions, as resulting from the Na-Hg diagram, for example as established by H. E. Bent and A. J. Forziati (J. Am. Chem. Soc. 1936, Vol. 58, p. 2222).

The quality of the contacts between the positive electrode consisting of the graphite derivative $M_xC_n(M'_yX_z)$ and the electrolyte can be improved by wetting said positive electrode with a polar solvent, e.g. propylene carbonate, whereby a thin film of said solvent can be formed between the positive electrode and the electrolyte. Other polar solvents, such as dimethylformamide, can also be resorted to, even in a storage battery of the type shown in FIG. 1, wherein the active alkali metal of the negative electrode consists of sodium and the solid electrolyte is formed of βalumina. As a matter of fact, βalumina is an efficient barrier against the sodium metal, whereby the latter cannot come into direct contact with the polar solvent.

It is also possible to dope the surfaces of the solid electrolyte in order to prevent the insulating film to be formed, or to provide on it a protective coating, for instance one formed with a "tungsten bronze" of the type disclosed in the publication of M. S. WITTINGHAM and R. A. HUGGINS, H. Chem. Phys. 54, 414 (1971).

The theoretical capacities of such storage batteries are considerable. Taking as an example the compound $Na_xC_8CrO_3$ in which $x$ may vary from 0 to 3, calculation shows that the maximum capacity obtainable therefrom is 1.1 kWh/kg, when it is assumed that the average available e.m.f. is of 3.5 volts. This theoretical capacity is obviously considerable when compared to that of a conventional lead battery which is of about 0.05 kWh/kg. The sodium-sulfur batteries referred to hereabove have a theoretical capacity of but 0.8 kWh/kg. Since such batteries operate only at a temperature above 300°C, such theoretical values need be divided by a factor of about 2, to take into account the required thermal insulation.

The battery units of the invention possess, in addition to theoretical capacities unknown up to now, other important advantages.

The unloading or loading of the battery unit may be continued up to the consumption or, on the contrary, the regeneration of a substantial fraction of the alkali metal contents of the positive electrode without any alteration of its basic characteristics.

The life of such battery units in open circuits has practically no limit, in view of the electronic transport number of the solid electrolyte which is substantially nil.

All parts of such battery units are solid, whereby their manufacture is easy, whatever be their sizes. Moreover the weight of the whole units can be reduced to a minimum, especially if one considers that solid electrolytes can be used in the form of very thin plates, which accordingly have negligible weights with respect to that of the electrodes.

The battery units so obtained are operative at temperatures included in a considerable range, i.e. from $-100°$ to $°200°C$.

It will finally be noted that lack of variation in the volume of the positive electrodes during the process of insertion (or extraction) of the alkali metal atoms inserted into the graphite derivative facilitates the preservation of any given geometry imparted to such electrodes, such as by cold-pressing.

EXAMPLE 6

Manufacture of a storage battery using a liquid electrolyte

The storage battery operative with a liquid electrolyte shown in FIG. 2 and describes hereafter comprises the following electrochemical chain:

Lithium/$LiClO_4$ in propylene carbonate/$Li_x C_{12}FeCl_3$.

The negative electrode or anode 20, in the form of a disk having a diameter of 20 mm and a thickness of about 2 mm, has been prepared by cold pressing in a steel mold. The cathode or positive electrode 22 has been initially formed with flakes previously washed with propylene carbonate of an intercalation compound of graphite and ferric chloride $C_{12}FeCl_3$. The cathode has also been shaped by cold pressing to the same size as the anode. Both electrodes are separated by a glass fiber disk 24 (WHATMAN) impregnated with electrolyte and acting as a separator. The whole unit is immersed in a liquid electrolyte 28 which is formed of a solution of lithium perchlorate in propylene carbonate, contained in a glass enclosure 30 sealingly closed by a copper lid 32. The tightness is achieved by means of a seal 34 made of a thermofusible resin (and formed in a glove-box protected from humidity). In the illustrated storage battery, the resin was the product available in the trade under the name APIEZON.

The battery unit thus achieved is characterized by a e.m.f. of 3.5 volts. The maximum available current intensity is 40 mA/cm².

It will be noted that the unloading of this storage battery implies the formation of the insertion compound $Li_x C_{12}FeCl_3$.

It will be understood that the invention is not restricted to the embodiments specifically disclosed in the foregoing disclosure and includes obvious alternatives as defined in the appended claims. In particular, the invention relates also to insertion compounds of alkali metals in intercalation compounds of graphite and any one of the following compounds: $CrO_2F_2$, $CrF_6$, $MnO_3F$, $Mn_2O_7$, or even $FeO_4$ insofar as the latter compound can be formed.

The invention of course also relates to the insertion compounds of alkali metals in intercalation compounds of graphite and any one of the following compounds: $FeCl_3$, $CuCl_2$, $CoCl_3$, $CoF_3$, $CrO_3$, $Sb_2O_5$, $V_2O_5$ as well as to the electrodes formed with the resulting compounds.

What I claim is:

1. A monophased graphite material which is electronically and ionically conductive which graphite material has the formula

wherein:
M is Li, Na, K, Rb, Cs or $NH_4$;
M' is a transition metal;
X is a non-metallic electronegative atom;
x is a whole number greater than 0;
n is the number of C atoms which is combined with the moiety $M'_y X_z$ in a monophase;
y and z are integers representing the relative number of M' and X atoms respectively of the moiety $M'_y X_z$ when it is in an oxidated valence state, said M being bonded to the lattice of an intercalation compound whose formula is $C_n(M'_y X_z)$ wherein M', X, n, y and z have the previously assigned significance, said M being present in an amount compatible with preservation of an oxidated valence state of the transition metal in the moiety $M'_y X_z$ and the monophased character of the material.

2. A monophased graphite material according to claim 1 wherein M' is a transition metal selected from the group consisting of titanium, vanadium, chromium manganese, iron and molybdenum, X is a non-metallic electronegative atom selected from the group consisting of oxygen, sulfur, fluorine, chlorine and bromine.

3. A monophased graphite material according to claim 1, wherein M' is chromium and n has a value equal from 2 to 6.

4. A monophased graphite material according to claim 3, wherein M is sodium and x has a value which is not nil and is between 0 and 3.

5. A monophased graphite material according to claim 3, wherein the graphite material contains a substance having the formula

wherein x has a value between 0 and 3.

6. A monophased graphite material according to claim 3, wherein the graphite material contains a substance having the formula

wherein x has a value between 0 and 4.

7. A monophased graphite material according to claim 2, wherein the moiety $M'_y X_z$ is selected from the group consisting of $FeCl_3$, $CuCl_2$, $CoCl_3$, $CoF_3$, $CrO_3$, $CrO_2Cl_2$, $V_2O_5$, said moiety being in a partially reduced valence state yet having a valence which preserves the same in an oxidated valence state and maintains the transition metal in the moiety $M'_yX_z$ such that it has a monophased character.

8. A monophased graphite material according to claim 2, wherein the moiety $M'_yX_z$ in the monophased graphite material is a manganese chloride having the formula $MnCl_z$ in which $z$ is higher than 2.

9. A monophased graphite material according to claim 2, wherein the moiety $M'_yX_z$ in its fully oxidated valence form is selected from the group consisting of $CrO_2F_2$, $CrF_6$, $MnO_3F$, $Mn_2O_7$.

10. A process for producing a monophased graphite material which is electronically and ionically conductive, which graphite material has the formula $M_xC_n(M'_yX_z)$ wherein:
M is an alkali specie;
M' is a transition metal;
X is a non-metallic electronegative atom;
$x$ is a whole number greater than 0;
$n$ is the number of C atoms which is combined with the moiety $M'_yX_z$ in a monophase;
$y$ and $z$ are integers representing the relative number of M' and X atoms respectively in the moiety $M'_yX_z$ when it is in an oxidated valence state, said M being bonded to the lattice in an intercalation compound whose formula is $C_n(M'_yX_z)$ where M', X, $n$, $y$ and $z$ have the previously assigned significance,
which comprises contacting a graphite material containing said intercalation compound with a compound which is the source of an alkali specie, the amount of said compound being such as to provide only that amount of alkali specie which is compatible with the preservation of an oxidated valence state of the transition metal in the moiety $M'_yX_z$ and of the monophased character of the material.

11. Process according to claim 10, wherein the compound capable of liberating the alkali element is an anion-radical.

12. Process according to claim 10, wherein the compound capable of liberating an alkali specie is selected from the group consisting of methyl-lithium, butyl-lithium and phenyl-lithium.

13. Process according to claim 10, wherein the initial intercalation compound is one of graphite and chromium-oxide, said intercalation compound being reacted with a solution of sodium in a polar solvent.

14. Process according to claim 10, wherein the reaction is carried out within a solvent selected from the group consisting of 1,2-dimethoxy-ethane, tetrahydrofuran and a mixture of 1,2-dimethoxy-ethane and naphthalene.

15. Process according to claim 10, wherein the source of alkali specie is a source of lithium and wherein the reaction is carried out within a non-polar solvent.

16. A process according to claim 15 wherein the non-polar solvent is hexane.

17. A process according to claim 10 wherein the graphite material containing the intercalation compound which is contacted with the source of alkali specie is in the form of a positive electrode of an electrochemical generator and the same is associated electrochemically with a negative electrode containing the alkali element to be inserted into said compound and while employing said electrolyte, effecting conductions of alkali specie ions of the alkali specie and controlling the amount of alkali specie ions so as to preserve the oxidated valence state of the transition metal in the moiety $M'_yX_z$ and the monophased character of the positive electrode.

18. A process according to claim 10 wherein the alkali specie is selected from the group consisting of lithium, sodium, potassium, rubidium, cesium and ammonium.

19. A process according to claim 18 wherein the transition metal is selected from the group consisting of titanium, vanadium, chromium, magnesium, iron and molybdenum.

* * * * *

UNITED STATES PATENT AND TRADEMARK OFFICE
CERTIFICATE OF CORRECTION

PATENT NO. : 3,956,194
DATED : May 11, 1976
INVENTOR(S) : Michel B. Armand

It is certified that error appears in the above-identified patent and that said Letters Patent are hereby corrected as shown below:

Item
[56], line 19, "Fast Publisher, Transport in Solids" should read -- "Fast Ion Transport in Solids" --.

Column 9, line 29, "sodium/ß alumina/$Na_x$ $C_8CrO_3$" should read -- sodium/ß alumina/$Na_{x_1}C_8CrO_3$ --.

Column 11, lines 37-38, "$Li_x$ $C_{1-2}FeCl_3$" should read -- $Li_{x_1}C_{12}FeCl_3$ --.

Signed and Sealed this

Twenty-third Day of November 1976

[SEAL]

Attest:

RUTH C. MASON
*Attesting Officer*

C. MARSHALL DANN
*Commissioner of Patents and Trademarks*